US008801136B2

(12) United States Patent
Chen et al.

(10) Patent No.: US 8,801,136 B2
(45) Date of Patent: Aug. 12, 2014

(54) FLAT FIELD AND DENSITY CORRECTION IN PRINTING SYSTEMS

(75) Inventors: Samuel Chen, Penfield, NY (US); Mark C. Rzadca, Fairport, NY (US); James M. Enge, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/537,247

(22) Filed: Jun. 29, 2012

(65) Prior Publication Data

US 2014/0002522 A1 Jan. 2, 2014

(51) Int. Cl.
*B41J 2/205* (2006.01)
*B41J 29/393* (2006.01)
*B41J 2/155* (2006.01)
*B41J 2/045* (2006.01)

(52) U.S. Cl.
CPC ............ *B41J 2/2056* (2013.01); *B41J 2/04558* (2013.01); *B41J 2202/21* (2013.01)
USPC ............................................. 347/15; 347/19

(58) Field of Classification Search
USPC ......................................................... 347/19
See application file for complete search history.

(56) References Cited

U.S. PATENT DOCUMENTS

| 5,946,006 | A | 8/1999 | Tajika et al. | |
|---|---|---|---|---|
| 6,094,280 | A * | 7/2000 | Hayasaki et al. | 358/1.9 |
| 6,840,597 | B1 | 1/2005 | Wilson et al. | |
| 2002/0126172 | A1* | 9/2002 | Akiyama | 347/19 |
| 2002/0171697 | A1* | 11/2002 | Gargir et al. | 347/14 |
| 2003/0020776 | A1* | 1/2003 | Franzke et al. | 347/19 |
| 2003/0071866 | A1* | 4/2003 | Wong et al. | 347/19 |
| 2004/0022570 | A1* | 2/2004 | Ioka et al. | 400/76 |
| 2004/0257952 | A1* | 12/2004 | Kimura | 369/59.12 |
| 2005/0122358 | A1* | 6/2005 | Mitsuzawa | 347/14 |
| 2007/0002344 | A1* | 1/2007 | Klassen | 358/1.9 |
| 2010/0060691 | A1* | 3/2010 | Tanase et al. | 347/14 |

* cited by examiner

*Primary Examiner* — Shelby Fidler
(74) *Attorney, Agent, or Firm* — Nancy R. Simon; Amit Singhal

(57) ABSTRACT

A density variation correction method for a printing system includes printheads in at least one linehead printing a test block pattern on a print media. A density variation trace is produced for each printed test block in the test block patterns by capturing an image of each test block and averaging pixel data in a transport direction. The density variation traces associated with a known print density represented in the test block pattern are compared with a respective reference density value. A determination is made as to whether there is a difference between each density variation trace and the respective reference density value. If there is a difference, the density variation trace is adjusted to match the reference density value. The method can be repeated for all of the known print densities represented in the test block pattern and for all of the lineheads in the printing system.

7 Claims, 14 Drawing Sheets

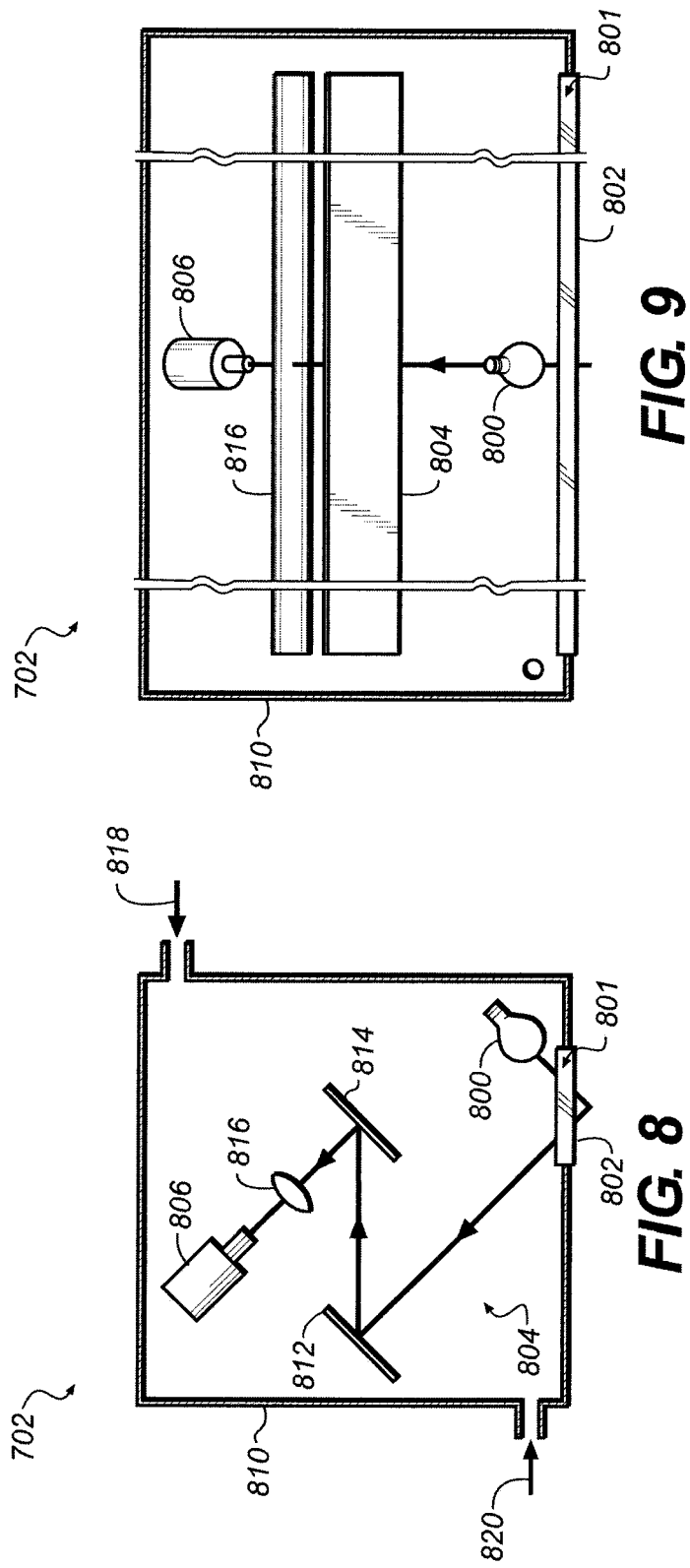

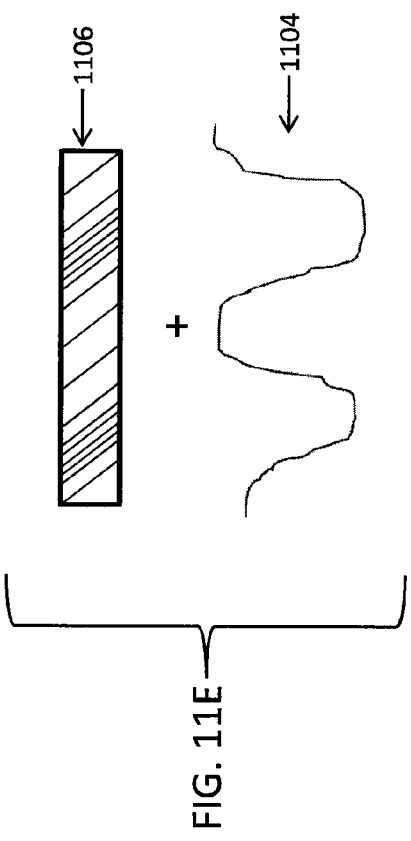
FIG. 11E
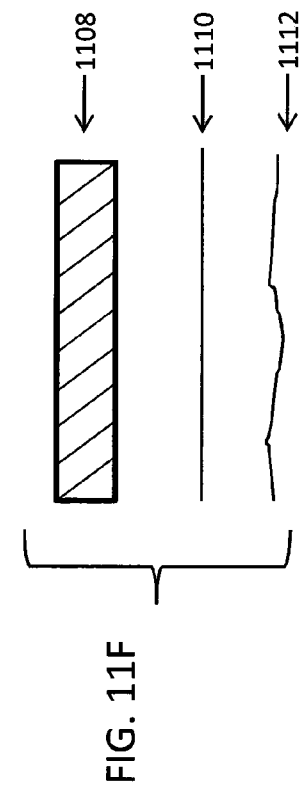
FIG. 11F
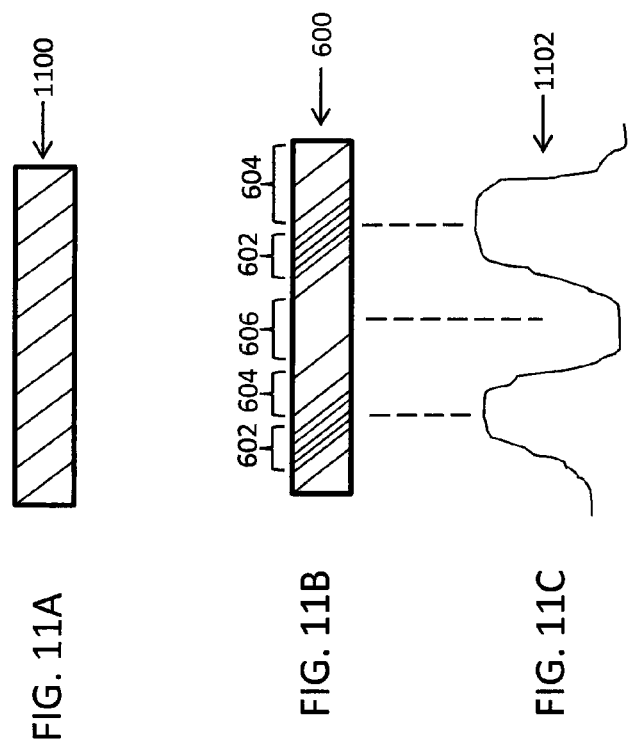
FIG. 11A
FIG. 11B
FIG. 11C
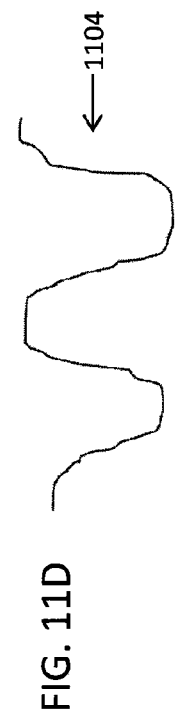
FIG. 11D

FLAT FIELD AND DENSITY CORRECTION IN PRINTING SYSTEMS

CROSS-REFERENCE TO RELATED APPLICATION

This patent application is related to U.S. patent application Ser. No. 13/537,240, entitled "FLAT FIELD AND DENSITY CORRECTION IN PRINTING SYSTEMS" filed concurrently herewith. This patent application is related to U.S. patent application Ser. No. 13/332,415 and U.S. patent application Ser. No. 13/332,417, both filed on Dec. 21, 2011.

TECHNICAL FIELD

The present invention generally relates to printing systems and more particularly to methods for flat field and density correction in printing systems.

BACKGROUND

In commercial inkjet printing systems, the lineheads typically include multiple printheads with each printhead including a nozzle plate. The nozzle plates include precisely sized and spaced nozzles. The diameter of each nozzle can range from five to twenty micrometers. Because multiple nozzle plates are used in many printing systems, the number of nozzles that are fabricated for each linehead can range between 12,000 to 30,000 nozzles.

It can be challenging to fabricate uniformly and consistently such small nozzles, as well as the other components associated with ink ejection in a linehead. Failure to precisely fabricate the components within and between nozzle plates can lead to non-uniformities in the content printed by the printing system. The resulting variations in ink lay down characteristics can lead to unpredictable variations in dark and light density regions. The dark and light density regions continue until corrected, but the necessary corrections may not occur for hundreds or thousands of feet of print media. The non-uniformities in the printed content can result in waste when the printed content is not usable. Additionally, the wasted print media causes a print job to be more costly and time consuming.

SUMMARY

In one aspect, a printing system can include one or more lineheads for jetting ink or liquid onto a moving print media and an integrated imaging system that captures one or more images of content printed on the moving print media. The integrated imaging system includes a housing, an opening in the housing for receiving light reflected from the print media, a folded optical assembly in the housing that receives the reflected light and transmits the light a predetermined distance, and an image sensor within the housing that receives the light and captures one or more images of the printed content on the moving print media.

In another aspect, a printing system can include at least one motion encoder that transmits an electronic pulse or signal proportional to a fixed amount of incremental motion of the print media. A signal output by the motion encoder can be used to trigger one or more respective image sensors to begin integrating the light reflected from the print media.

In another aspect, a printing system can include at least one processing device that processes images captured by the integrated imaging system or systems.

In another aspect, a printing system can include at least one linehead that jets ink onto a moving print media and an integrated imaging system that captures images of the content printed on the moving print media. Each linehead can include one or more printheads. A method for flat field correction in the printing system can include one or more printheads printing a test block having a known print density on the print media and producing a density variation trace for each of the one or more printheads by capturing an image of each printed test block and averaging pixel data in a transport direction. The pixel data can be optically or numerically averaged. A negative print mask is then produced for each printhead in the one or more printheads by inverting each density variation trace. Each negative print mask is combined with respective print data values transmitted to each respective printhead in the one or more printheads. For example, each negative print mask is added to, or subtracted from, respective print data values transmitted to each respective printhead in the one or more printheads.

In another aspect, the method can include the one or more printheads printing another test block having the known density value using the flat field corrected print data values and producing another density variation trace for each printhead in the one or more printheads by capturing an image of each printed test block and averaging pixel data in a transport direction. The pixel data can be optically or numerically averaged. A determination is made as to whether each other density variation trace is within a tolerance range. If a density variation trace is not within the tolerance range, another negative print mask is produced for the respective printhead by inverting the other density variation trace and the other negative print mask is summed with a previous print mask.

In another aspect, a printing system can include at least one linehead that jets ink onto a moving print media and an integrated imaging system that captures images of the content printed on the moving print media. Each linehead can include one or more printheads. A method for density variation correction can include the printheads in at least one linehead printing a test block pattern on the print media, where the test block pattern includes test blocks having different known print densities. The printheads can print the test block pattern using flat field corrected print data values. A density variation trace is produced for each printed test block in the test block patterns by capturing an image of each test block and averaging pixel data in a transport direction. The pixel data can be optically or numerically averaged. The density variation traces associated with a known print density represented in the test block pattern are compared with a respective reference density value. A determination is made as to whether there is a difference between each density variation trace and the respective reference density value. If there is a difference, the density variation trace is adjusted to match the reference density value. The method can be repeated for all of the known print densities represented in the test block pattern and for all of the lineheads in the printing system.

In another aspect, the method for density variation correction can include determining an average density variation trace for each known print density represented in the test block pattern using the density variation traces that are associated with each known print density in the test block pattern and adjusting the density variation traces to match respective average density variation traces.

BRIEF DESCRIPTION OF THE DRAWINGS

Embodiments of the invention are better understood with reference to the following drawings. The elements of the drawings are not necessarily to scale relative to each other.

FIG. 8 is a cross-sectional view along line 8-8 in FIG. 7 in an embodiment in accordance with the invention;

FIG. 9 is a cross-sectional view along line 9-9 in FIG. 7 in an embodiment in accordance with the invention;

FIG. 11A-11F illustrate the method shown in FIG. 10 in an embodiment in accordance with the invention;

DETAILED DESCRIPTION

Figure 1:
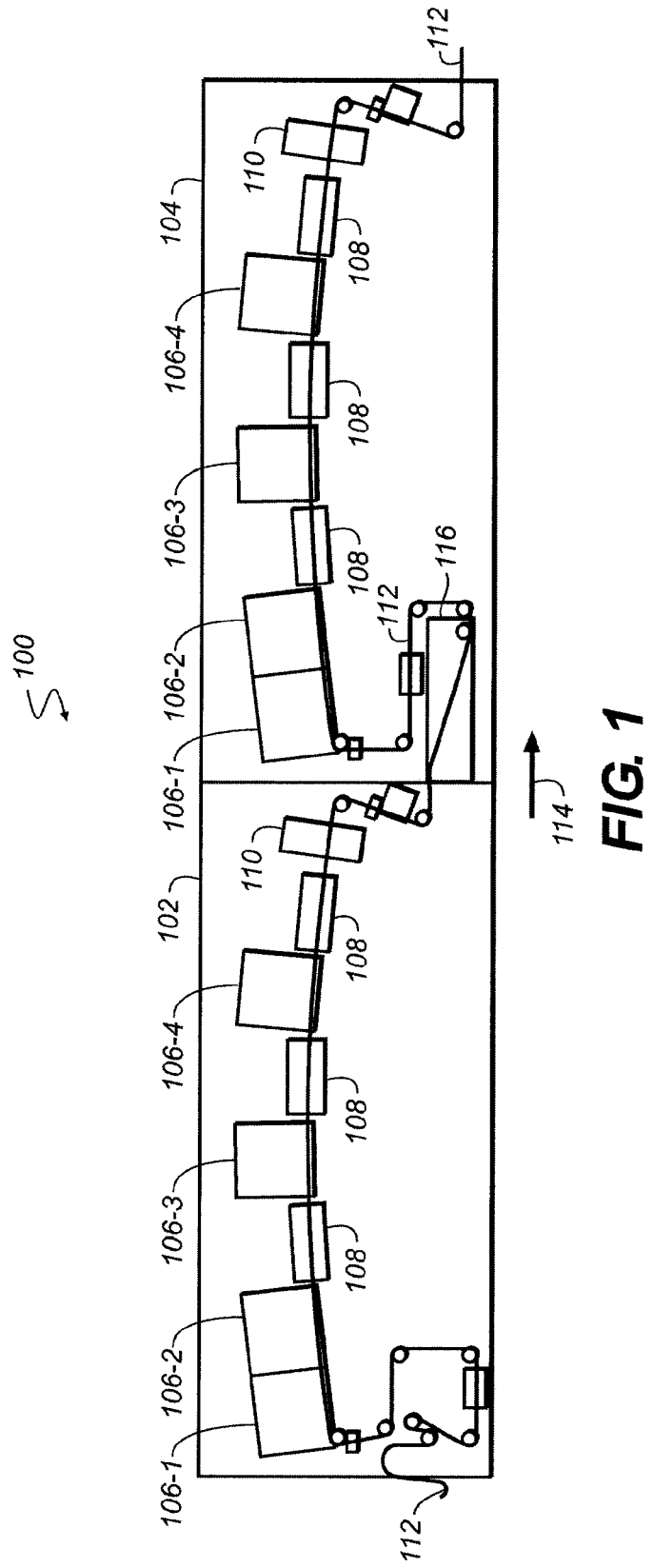
FIG. 1 illustrates one example of an inkjet printing system that prints on a continuous web of print media.

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of embodiments of the present invention can be positioned in a number of different orientations, the directional terminology is used for purposes of illustration only and is in no way limiting.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. As such, as described herein, the terms "liquid" and "ink" refer to any material that is ejected by the printhead or printhead components described below.

Inkjet printing is commonly used for printing on paper. However, there are numerous other materials in which inkjet is appropriate. For example, vinyl sheets, plastic sheets, textiles, paperboard, and corrugated cardboard can comprise the print media. Additionally, although the term inkjet is often used to describe the printing process, the term jetting is also appropriate wherever ink or other liquids is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of media, generally originating from a source roll. The continuous web of print media is moved relative to the inkjet printing system components via a web transport system, which typically include drive rollers, web guide rollers, and web tension sensors. Cut sheets refer to individual sheets of print media that are moved relative to the inkjet printing system components via rollers and drive wheels or via a conveyor belt system that is routed through the inkjet printing system.

The invention described herein is applicable to both types of printing technologies. As such, the terms printhead and linehead, as used herein, are intended to be generic and not specific to either technology. Additionally, the invention described herein is applicable to both types of print media. As such, the terms web and print media, as used herein, are intended to be generic and not as specific to either type of print media or the way in which the print media is moved through the printing system.

Figure 2:
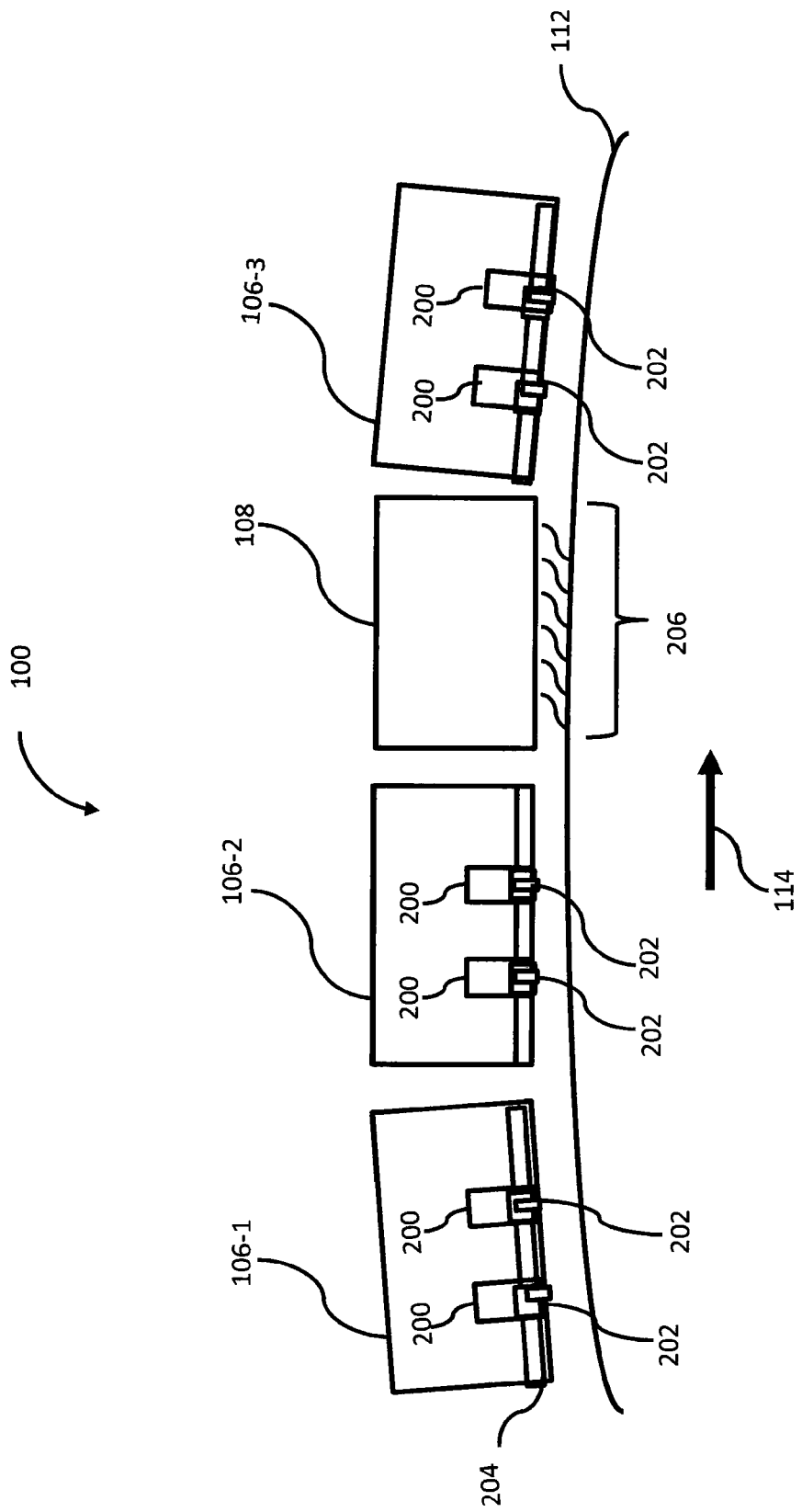
FIG. 2 depicts a portion of printing system 100 in more detail.
Figure 3:
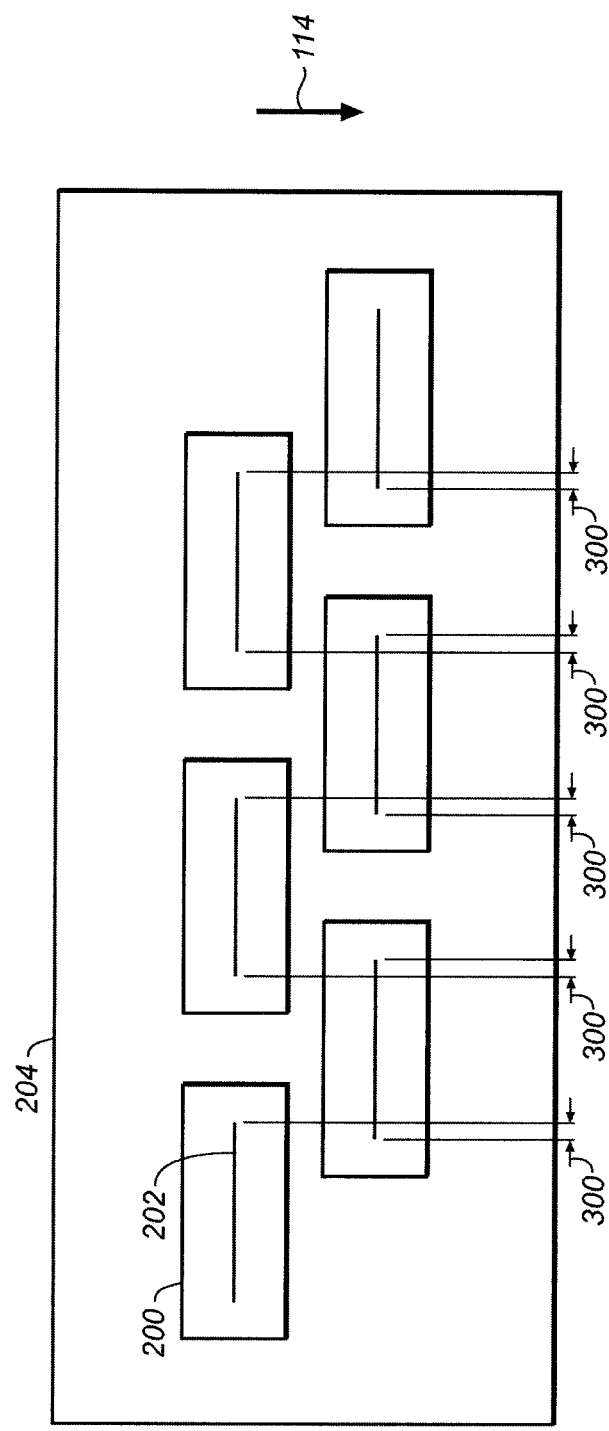
FIG. 3 illustrates a side of the support structure 204 that is adjacent to the print media 112 in an embodiment in accordance with the invention.

The terms "upstream" and "downstream" are terms of art referring to relative positions along the transport path of the print media; points on the transport path move from upstream to downstream. In FIGS. 1-3 the media moves in the direction indicated by transport direction arrow 114. Where they are used, terms such as "first", "second", and so on, do not necessarily denote any ordinal or priority relation, but are simply used to more clearly distinguish one element from another.

Referring now to the schematic side view of FIG. 1, there is shown one example of an inkjet printing system for continuous web printing on a print media. Printing system 100 includes a first printing module 102 and a second printing module 104, each of which includes lineheads 106, dryers 108, and a quality control sensor 110. Each linehead 106 typically includes multiple printheads (not shown) that apply ink or another liquid to the surface of the print media 112 that is adjacent to the printheads. For descriptive purposes only, the lineheads 106 are labeled a first linehead 106-1, a second linehead 106-2, a third linehead 106-3, and a fourth linehead 106-4. In the illustrated embodiment, each linehead 106-1, 106-2, 106-3, 106-4 applies a different colored ink to the surface of the print media 112 that is adjacent to the lineheads. By way of example only, linehead 106-1 applies cyan colored ink, linehead 106-2 magenta colored ink, linehead 106-3 yellow colored ink, and linehead 106-4 black colored ink.

The first printing module 102 and the second printing module 104 also include a web tension system that serves to physically move the print media 112 through the printing system 100 in the transport direction 114 (left to right as shown in the figure). The print media 112 enters the first printing module 102 from a source roll (not shown) and the linehead(s) 106 of the first module applies ink to one side of the print media 112. As the print media 112 feeds into the second printing module 104, a turnover module 116 is adapted to invert or turn over the print media 112 so that the linehead(s) 106 of the second printing module 104 can apply ink to the other side of the print media 112. The print media 112 then exits the second printing module 104 and is collected by a print media receiving unit (not shown).

Although FIG. 1 depicts each printing module with four lineheads 106, three dryers 108, and one quality control sensor 110, embodiments in accordance with the invention are not limited to this construction. A printing system can include any number of lineheads, any number of dryers, and any number of quality control sensors. The printing system can also include a number of other components, including, but not limited to, web cleaners and web tension sensors.

And although the printing system shown in FIG. 1 has the turnover module 116 disposed between the first and second printing modules 102, 104, other printing systems can include the turnover module within one of the printing modules.

FIG. 2 illustrates a portion of printing system 100 in more detail. As the print media 112 is directed through printing system 100, the lineheads 106, which typically include a plurality of printheads 200, apply ink or another liquid onto the print media 112 via the nozzle arrays 202 of the printheads 200. The printheads 200 within each linehead 106 are located and aligned by a support structure 204 in the illustrated embodiment. After the ink is jetted onto the print media 112, the print media 112 passes beneath the one or more dryers 108 which apply heat 206 to the ink on the print media.

Referring now to FIG. 3, there is shown a side of the support structure 204 that is adjacent to the print media 112 in an embodiment in accordance with the invention. The printheads 200 are aligned in a staggered formation, with upstream and downstream printheads 200, such that the nozzle arrays 202 produce overlap regions 300. The overlap regions 300 enable the print from overlapped printheads 200 to be stitched together without a visible seam through the use of appropriate stitching algorithms that are known in the art. These stitching algorithms ensure that the amount of ink printed in the overlap region 200 is not higher or lower than other portions of the print.

In a commercial ink jet printing system, such as the printing system depicted in FIG. 1, the printheads 200 are typically 4.25 inches wide and multiple printheads 200 are used to cover the varying widths of different types of print media. For example, the widths of the print media can range from 4.25 inches to 52 inches. Each nozzle array 202 includes one or more lines of openings or nozzles that emit ink drops. The ink drops have a particular pitch or spacing in the cross-web direction. The cross-web pitch is determined by the spacing between nozzles. For example, cross-web ink drop pitches can vary from 300 to 1200 drops per inch.

Figure 4:
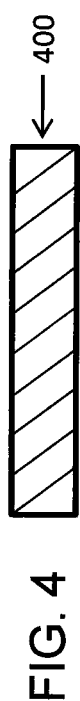
FIGS. 4-6 are graphical illustrations of examples of printed content and density variations in an embodiment in accordance with the invention.

Streams of print drops can travel a distance of about 1 to 15 mm from the printhead to the print media in some printing systems. FIG. 4 illustrates printed content 400 that is printed with a uniform density on the print media. In some situations, the streams of drops can produce density variations in the printed content. By way of example only, streams of drops that are not parallel to each other, or are not positioned at the proper pitch, result in variations in density that are seen as adjacent light and dark band regions. Density variations can be caused by a nozzle not ejecting ink drops, a nozzle that is "stuck on" that jets a steady stream of ink drops, or a crooked nozzle where the jetted ink intersects with an ink stream from one or more neighboring nozzles. These nozzle failures produce print defects (lighter or darker streaks) that extend in the media transport direction (e.g., direction 114 in FIG. 1) and continue until the problem is corrected. Unfortunately, the corrections may not occur for hundreds or thousands of feet of print media.

Figure 5:
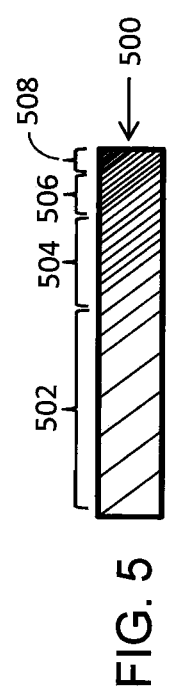

Referring now to FIG. 5, there is shown an example of printed content 500 with density variations in an embodiment in accordance with the invention. Region 502 has the expected uniform density, but region 504 has a higher density than region 502. Region 506 has a higher density than region 504. And finally, region 508 has a higher density than region 506.

Figure 6:
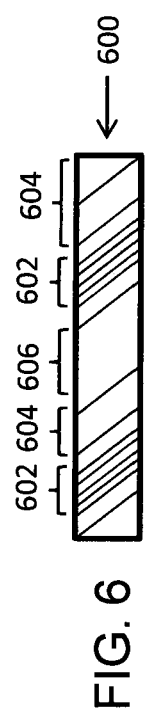

FIG. 6 depicts another example of printed content 600 with density variations in an embodiment in accordance with the invention. Regions 602 have a higher density than regions 604. Regions 604 have a uniform density. And region 606 has a lower density than regions 604. Region 606 can be visible as a blank streak on the printed media, while regions 602 can be visible as darker streaks on the print media.

Figure 7:
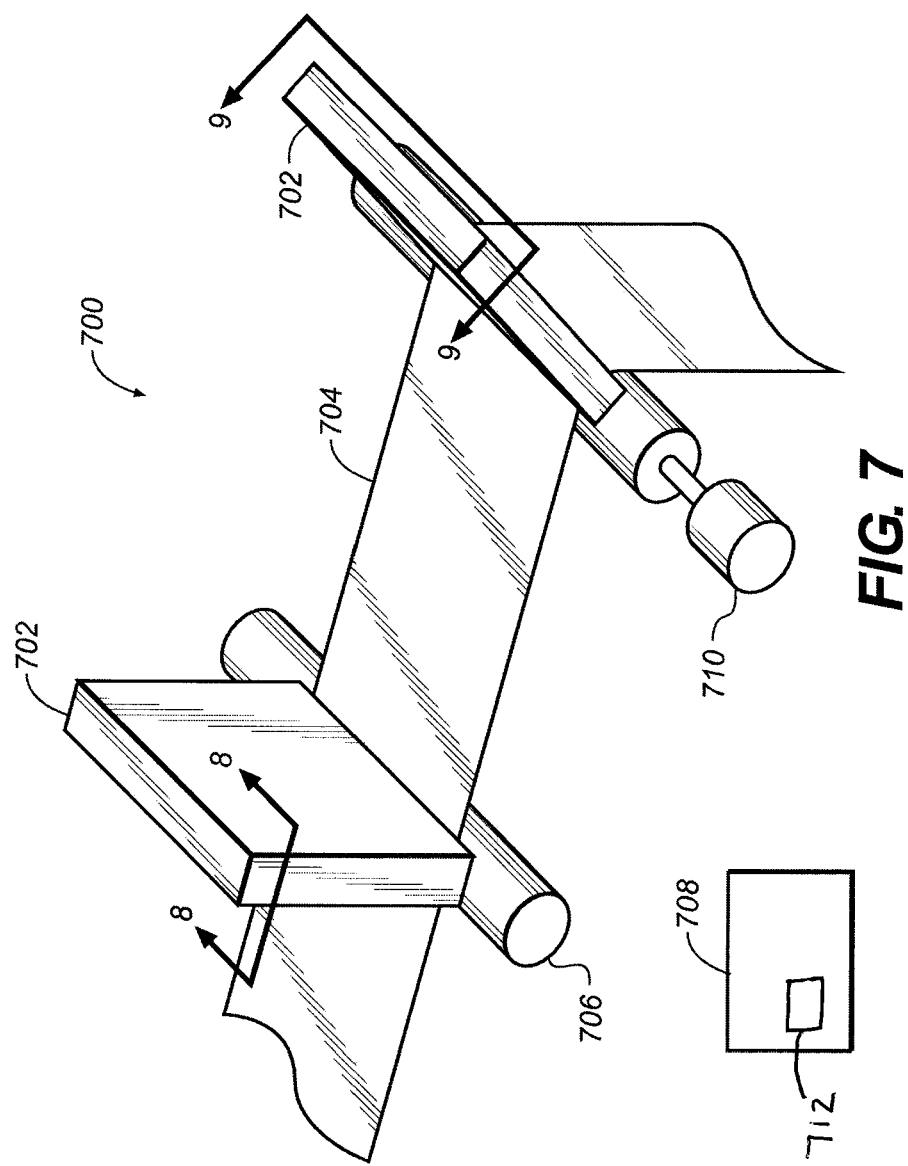
FIG. 7 depicts a portion of a printing system in an embodiment in accordance with the invention.

Referring now to FIG. 7, there is shown a portion of a printing system in an embodiment in accordance with the invention. Printing system 700 includes one or more integrated imaging systems 702 disposed over the print media 704. The integrated imaging systems 702 are connected to an image processing device 708. The image processing device 708 is adapted to process pixel data received from the integrated imaging systems 702 and detect flat field and density variations in the printed content on the print media 704.

The integrated imaging systems 702 are disposed over the print media 704 at locations in a printing system where the print media is transported over rollers 706 in an embodiment in accordance with the invention. The print media can be more stable, both in the cross-track and in-track (feed) directions, when moving over the rollers 706. In other embodiments in accordance with the invention, one or more integrated imaging systems can be positioned at any location in a printing system.

The integrated imaging system or systems 702 can be connected to and transmit data to the image processing device 708 through any known wired or wireless connection. Image processing device 708 can be external to printing system 700; integrated within printing system 700; or integrated within a component in printing system 700. The image processing device 708 can be implemented with one or more processing devices, such as a computer or a programmable logic circuit.

Motion encoder 710 can be used to produce an electronic pulse or signal proportional to a fixed amount of incremental motion of the print media in the feed direction. The signal from motion encoder 710 is used to trigger an image sensor (see 806 in FIG. 8) to begin capturing an image of the printed content on the moving print media using the light reflected off the print media.

Connected to the image processing device 708 is one or more storage devices 712. The storage device 712 can store negative pattern masks, average density traces, or reference density values in an embodiment in accordance with the invention. The storage device 712 can be implemented as one or more external storage devices; one or more storage devices included within the image processing device 708; or a combination thereof.

FIG. 8 is a cross-sectional view along line 8-8 in FIG. 7 in an embodiment in accordance with the invention. Integrated imaging system 702 includes light source 800, transparent cover 802, folded optical assembly 804, and image sensor 806 all enclosed within housing 810. In the illustrated embodiment, folded optical assembly 804 includes mirrors 812, 814 and lens 816. Mirrors 812, 814 can be implemented with any type of optical elements that reflects light in embodiments in accordance with the invention.

Light source 800 transmits light through transparent cover 802 and towards the surface of the print media (not shown). The light reflects off the surface of the print media and propagates through the transparent cover 802 and along the folded optical assembly 804, where mirror 812 directs the light towards mirror 814, and mirror 814 directs the light toward lens 816. The light is focused by lens 816 to form an image on image sensor 806. Image sensor 806 captures one or more images of the print media as the print media moves through the printing system by converting the reflected light into electrical signals.

Folded optical assembly 804 bends or directs the light as it is transmitted to image sensor 806 such that the optical path traveled by the light is longer than the size of integrated imaging system 702. Folded optical assembly 804 allows the imaging system 702 to be constructed more compactly, reducing the weight, dimensions, and cost of the imaging system. Folded optical assembly 804 can be constructed differently in other embodiments in accordance with the invention. Additional or different optical elements can be included in folded optical assembly 804.

As discussed earlier, image sensor 806 can receive a signal from a motion encoder (e.g., 710 in FIG. 7) each time an incremental motion of the print media occurs in the feed direction. The signal from the motion encoder is used to trigger image sensor 806 to begin integrating the light reflected from the print media. In the case of a linear image sensor, the unit of incremental motion is typically configured such that an integration period begins with sufficient frequency to sample or image the print media in the feed direction with the same resolution as is produced in the cross-track direction. If the trigger occurs at a rate which produces a rate that results in sampling in the in-track (feed) direction at a higher rate, an image that is over sampled in that direction is produced and the imaged content appears elongated or stretched in the in-track direction. Conversely, a rate that is lower for the in-track direction produces imaged content that is compressed in the in-track direction.

The time period over which the integration occurs determines how much print media moves through the field of view of the imaging system. With shorter integration periods such as a millisecond or less, the motion of the print media can be minimized so that fine details in the in-track direction can be imaged. When longer integration periods are used, the light reflected off the print media is collected while the print media is moving and the motion of the print media means the printed content is blurred in the direction of motion. The blurring in the direction of motion has the effect of averaging the pixel data in one direction, the in-track (feed) direction. Averaging the pixel data through blurring is also known as optical averaging. By performing the averaging optically with longer integration periods, the amount of data that is transferred to and processed by a processing device (e.g., 708 in FIG. 7) is reduced. Blurring reduces image resolution in the in-track direction, and is therefore generally avoided for applications that require the identification of artifacts that are small and occur randomly.

The amount of optical averaging can be increased by reducing the frequency of the pulses from the motion encoder (e.g., 710 in FIG. 7) and extending the integration time of the image sensor (e.g., 806 in FIG. 8) in the imaging system (e.g., 702 in FIG. 8). Reducing the frequency of the pulses has the benefit of reducing the amount of data transferred to the image processing device and of reducing the numerical averaging performed by the image processing device (e.g., 708 in FIG. 7). Additional numerical averaging or other image processing of the pixel data in the in-track direction can be computed by the processing device on images captured by the image sensor. The amount of optical image averaging can be decreased with an increase in the numerical averaging required. The ability to use optical averaging not only significantly reduces the camera hardware cost, but also its footprint size.

In another embodiment in accordance with the invention, averaging of the pixel data in one direction can be performed by a processing device (e.g., 708 in FIG. 7) using multiple images captured by the image sensor. The images can be captured with shorter integration times in an embodiment in accordance with the invention. The processing device numerically averages the pixel data in one direction, the in-track direction, to produce blurring in an image or images. The processing device can also perform other types imaging processing procedures in addition to the numerical averaging of the pixel data.

Returning to FIG. 8, the transparent cover 802 is disposed over an opening 801 in the housing 810. Transparent cover 802 is optional and can be omitted in other embodiments in accordance with the invention. Integrated imaging system 702 can also include vent openings 818, 820. Vent opening 818 can be used to input air or gas while vent opening 820 can be used to output exhaust. The input air or gas can be used to maintain a clean environment and control the temperature within integrated imaging system 702. In another embodiment in accordance with the invention, integrated imaging system 702 can include one or more vent openings (e.g., vent opening 818) that input air or gas and the opening 801 in the housing 810 is used to output exhaust.

FIG. 9 is a cross-sectional view along line 9-9 in FIG. 7 in an embodiment in accordance with the invention. As described, light source 800 transmits light through transparent cover 802 and towards the surface of the print media (not shown). The light reflects off the surface of the print media, propagates along folded optical assembly, and is directed toward lens 816. Lens 816 focuses the light to form an image on image sensor 806. Image sensor 806 can be implemented with any type of image sensor, including, but not limited to, one or more linear image sensors constructed as a charge-coupled device (CCD) image sensor or a complementary metal oxide semiconductor (CMOS) image sensor.

Figure 10:
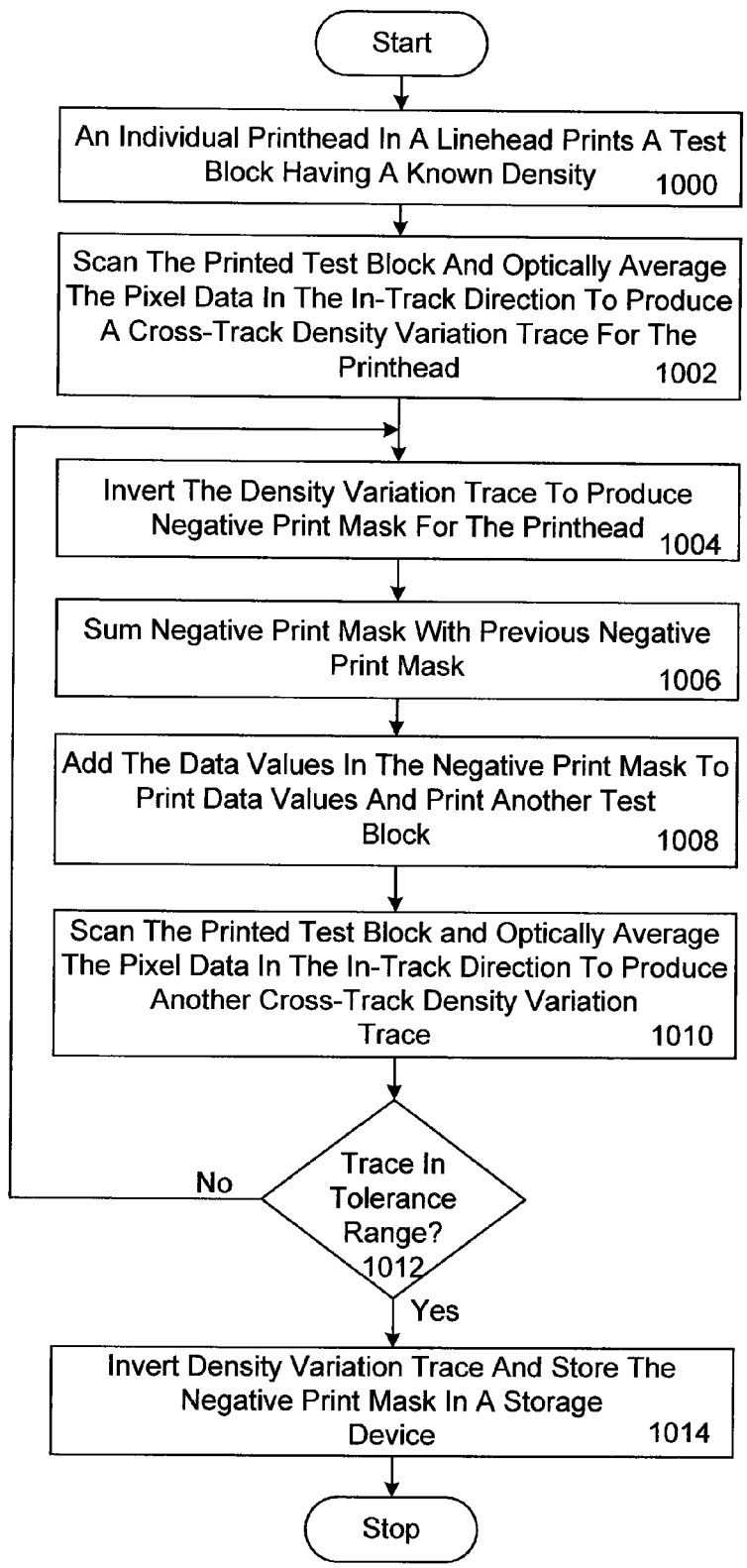
FIG. 10 is a flowchart of a method for flat field correction in a printing system in an embodiment in accordance with the invention.

The images of the print media formed on the image sensor 806 are converted to a digital representation that is suitable for analysis in a computer or image processing device. Referring now to FIG. 10, there is shown a flowchart of a method for flat field correction in a printing system in an embodiment in accordance with the invention. As described earlier, variations in ink lay down characteristics can lead to unpredictable variations in dark and light density regions. One process of adjusting or correcting for non-uniform print density within and between nozzles in a printhead is flat field correction. The method of FIG. 10 is described in conjunction with one printhead included in a linehead, but those skilled in the art will recognize the method can be used with multiple printheads in one or more lineheads. For example, the linehead 106 shown in FIG. 2 has six printheads 200. The method can be performed with all six printheads in the one linehead, either simultaneously or at select times. Additionally, the printing system shown in FIG. 1 has eight lineheads. The method can be performed with all eight lineheads, either simultaneously or at select times. Initially, a printhead in a linehead prints a test block having a known or fixed print density (block 1000). The test block can include any given content having a known print density. FIG. 11A illustrates one example of a test block 1100 having a known density. FIG. 11B depicts an example of a printed test block 600 having a non-uniform density. Test block 600 represents the same print data values for block 1100 but as actually printed by a printhead. Test block 600 has the density variation regions 602, 604, and 606 as described in conjunction with FIG. 6. Regions 604 have the known or expected density. Regions 602 have a higher density and region 606 a lower density than regions 604.

Regions 602, 604, and 606 are shown in FIG. 11B. No new matter has been added.

The printed test block is then scanned and the pixel data averaged in the in-track (feed) direction to produce a cross-track density variation trace for the printhead (block 1002). The pixel data is optically averaged in the illustrated embodiment. The pixel data can be numerically averaged in another embodiment in accordance with the invention.

FIG. 11C illustrates the cross-track density variation trace 1102 for test block 600. Regions 602 have higher peaks in the trace 1102 than regions 604 because regions 602 have higher density values. Region 606 has lower density values in the trace 1102 than regions 604 as a result of the lower density. Next, as shown in block 1004, the density variation trace is inverted to produce a negative print mask for the printhead. FIG. 11D depicts an inverted density variation trace 1104 for density variation trace 1102. In the inverted density variation trace 1104, the higher peaks become lower peaks and the lower peaks become higher peaks compared to the density variation trace 1102. The inverted density variation trace 1104 is a negative print mask for the printhead that printed test block 600.

The negative print mask is then added to, or subtracted from the previous negative print mask at block 1006. When the method is performed for the first time, only one negative print mask for the printhead exists so the negative print mask does not change. As will be described with block 1012, blocks 1004-1012 can repeat when a density variation trace is not within a tolerance range. Another negative print mask is produced each time the blocks repeat and the current negative print mask is added or summed with the preceding negative print mask at block 1006.

The negative print mask for the printhead is then added or combined with the original print data values and another test block is printed (block 1008). The negative print mask can be added to, or subtracted from, respective print data values transmitted to the printhead. The printed test block is scanned and the pixel data averaged in the in-track direction to produce another cross-track density variation trace for the printhead (block 1010). A determination is then made at block 1012 as to whether or not the density variation trace is within a given tolerance range. The tolerance range can be based on the expected or known density. For example, the tolerance range can be +5% to −5% of the known density.

If the density variation trace is not within the tolerance range, the process returns to block 1004 and repeats until the density variation trace is within the tolerance range. FIG. 11E graphically illustrates the addition of the values in the negative print mask 1104 to the printing characteristics of the printhead when the requested content is printed. In FIG. 11E, the uncorrected content that is to be printed is represented by block 1106. The addition of the values in the negative print mask corrects for flat field and produces printed content 1108 having a uniform density, as graphically depicted in FIG. 11F. Ideally, the flat field corrected content 1108 that is printed now closely resembles the intended content 1100. When the printed content 1108 has a uniform density, a substantially flat density variation trace 1110 is produced for that content 1108. A substantially flat density variation trace can be represented by a single density value by averaging the values in the density variation trace. A single value can be useful for comparison between printheads, both within and between lineheads, and between a printhead and a reference value.

However, in some situations the printed content does not have a uniform density and a density variation trace 1112 having some variations is produced, as shown in FIG. 11F. If the density variation trace 1112 is not within the tolerance range, the method would return to block 1006 and repeat until the density variation trace is within the tolerance range. If the density variation trace 1112 is within the tolerance range, the average of the trace 1112 becomes the single density value for the printhead.

Returning to FIG. 10, when the density variation trace is within the tolerance range the method passes to block 1014 where the density variation trace is inverted and the negative print mask stored in a storage device. By way of example only, the density variation traces and/or the negative print masks for all of the printheads can be stored in a look-up table in the storage device 712 in FIG. 7.

Embodiments in accordance with the invention can perform the method shown in FIG. 10 one or more times. The method of FIG. 10 can be performed each day prior to beginning any print jobs to calibrate the printing system. And the method of FIG. 10 can be performed during a print job to monitor and correct for any flat field errors that develop during the print job.

Embodiments in accordance with the invention can perform the method shown in FIG. 10 differently or can include additional functions or processes. For example, blocks 1006, 1008, and 1010 can be performed periodically or at select times. Additionally, some of the blocks can be omitted in other embodiments in accordance with the invention. By way of example only, blocks 1006, 1008, and 1010 can be omitted.

In some embodiments, one or more printheads in a linehead can lay down or jet ink with slightly different characteristics compared to the other printheads in the linehead. The different characteristics can produce density variations in the printed content across the width of the print media. The density variations can result in differential, and possibly objectionable, banding between the printheads in the linehead. The density variations in printed content can be produced even if the flat field correction method of FIG. 10 has been performed because the method of FIG. 10 corrects for density variations within a printhead. One process of correcting for the density variations between printheads in a linehead is density variation correction.

Figure 12:
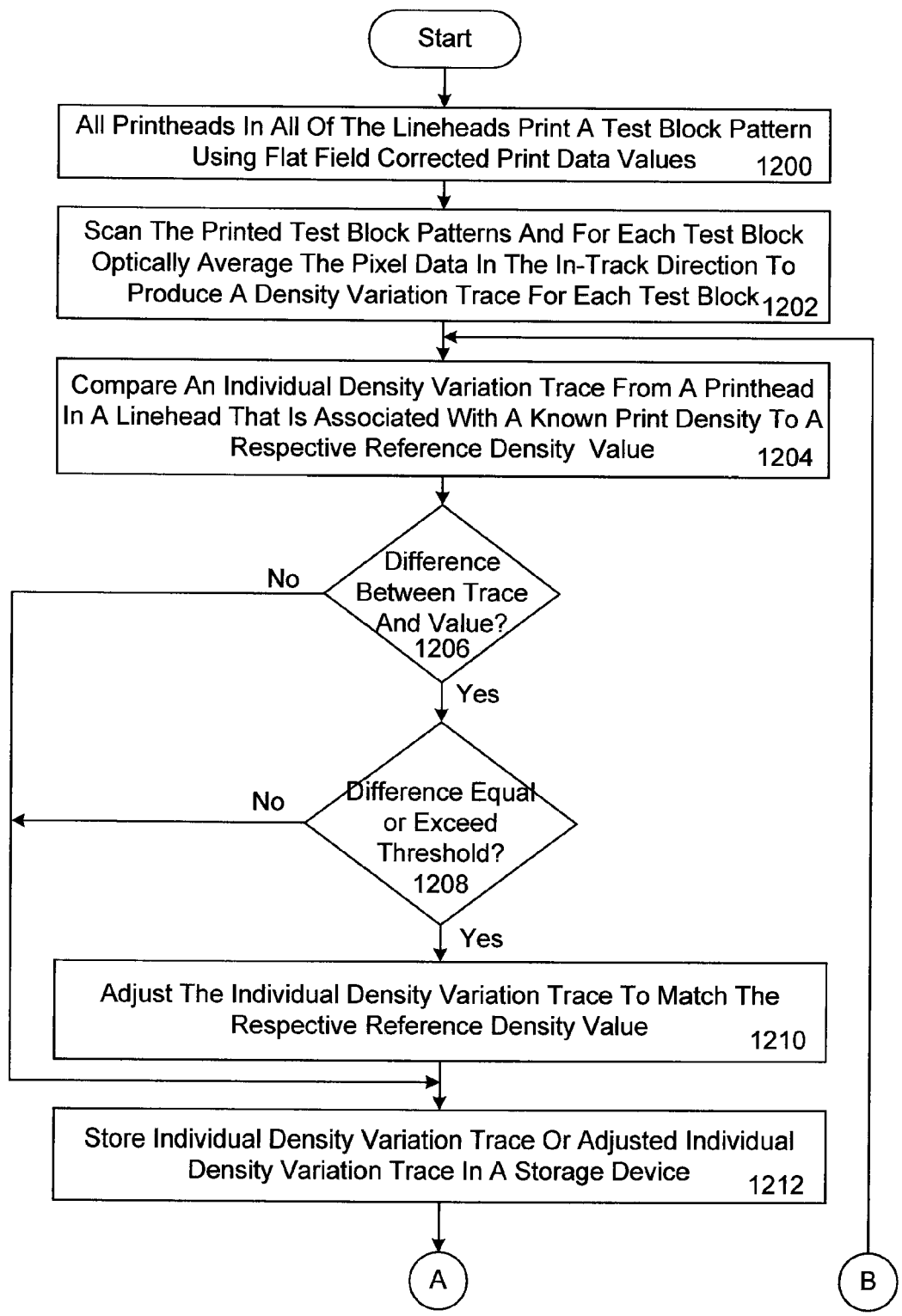
FIG. 12 is a flowchart of a first method for density variation correction in a printing system in an embodiment in accordance with the invention.
Figure 12:
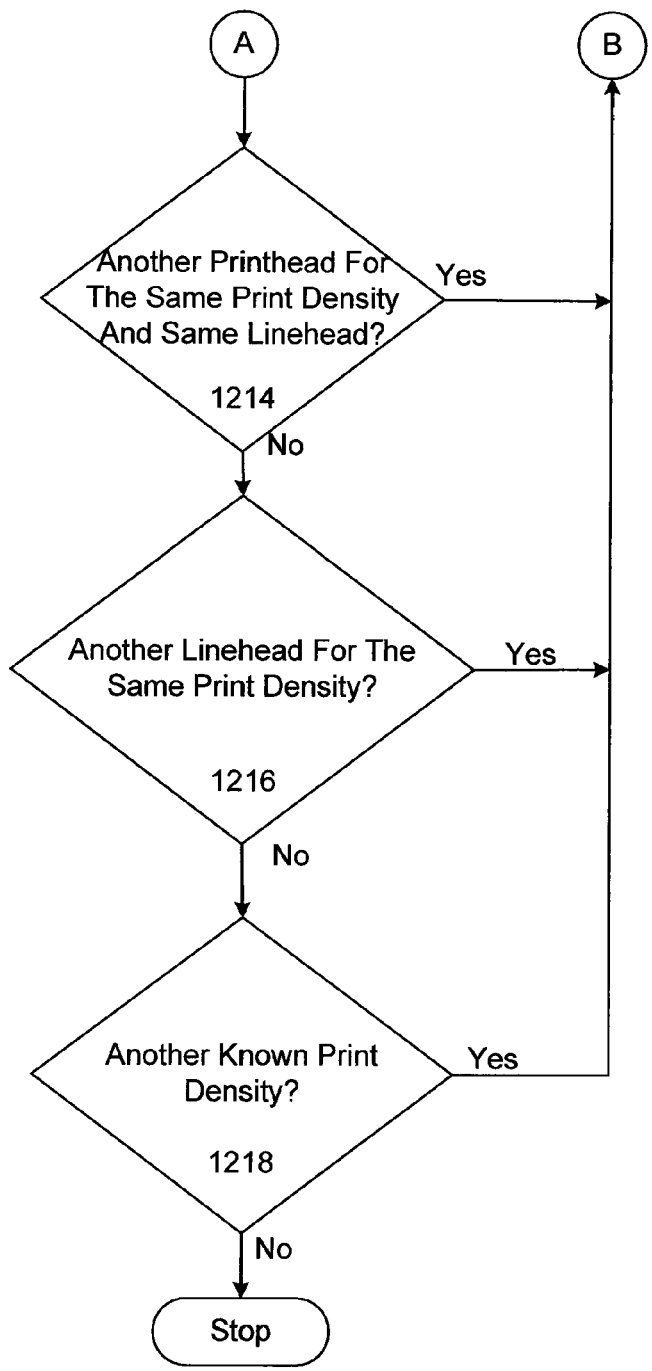
Figure 13:
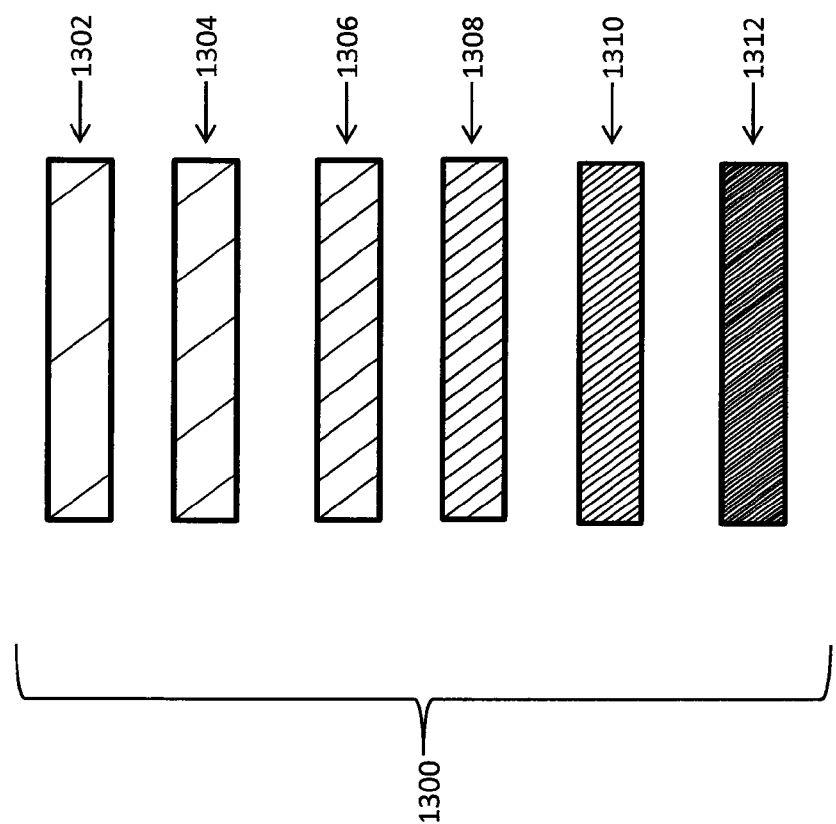
FIG. 13 depicts an example of a test block pattern in an embodiment in accordance with the invention.

FIG. 12 is a flowchart of a first method for density variation correction in a printing system in an embodiment in accordance with the invention. Initially, all of the printheads in all of the lineheads each print a test block pattern using flat field corrected print data values (block 1200). The flat field corrected print data values can be determined using the method shown in FIG. 10. A test block pattern includes test blocks having different known print densities in an embodiment in accordance with the invention. FIG. 13 depicts an example of a test block pattern in an embodiment in accordance with the invention. Test block pattern 1300 includes six test blocks with each test block having a known print density that is different from the other test blocks. By way of example only, test block 1302 can have a print density of 0.2, test block 1304 a print density of 0.4, test block 1306 a print density of 0.6, test block 1308 a print density of 0.8, test block 1310 a print density of 1.0, and test block 1312 a print density of 1.2.

Returning to FIG. 12, the test block patterns are each scanned and the pixel data for each test block averaged in the in-track direction to produce a density variation trace for each test block (block 1202). The pixel data is optically averaged in the illustrated embodiment. The pixel data can be numerically averaged in another embodiment in accordance with the invention.

Because flat field correction was performed prior to performing density correction in the illustrated embodiment, the density variation trace is substantially flat for each printhead. As described earlier, a flat density variation trace can be represented by a single density value when the values in the density variation trace are averaged.

Once the individual density variation traces for the different print densities in the test block pattern have been produced for the printheads, an individual density variation trace for a printhead that is associated with one of the known print densities in the test block pattern is compared to a respective reference density value at block 1204. Reference density values can be supplied by a printer manufacturer in an embodiment in accordance with the invention. The printer manufacturer prepares the reference density values after testing for density against an array of variables, including, but not limited to, print media type, ink formulation, and printhead properties. The reference density values can be stored by the manufacturer in a storage device.

In another embodiment, an operator or customer can determine reference density values. For example, a customer can request the print densities of one printing system match the print densities of another printing system. Alternatively, an operator or customer can produce reference density values for a particular print job based on visually pleasing density values for that print job.

A determination is then made at block 1206 as to whether or not there is a difference between the individual density variation trace and the respective reference density value. If there is a difference, a determination is made at block 1208 as to whether or not the difference equals or exceeds a given threshold value.

If the difference equals or exceeds the threshold value, the individual density variation trace is adjusted to match the respective reference density value at block 1210. The ink lay down characteristics of the printhead is adjusted proportionally across all of the nozzles in the printhead so that the overall printed density of the printhead is changed. The overall printed density of the printhead for that known print density can increase or decrease without changing the flat field uniformity. The resulting change produces a printed density that is the same, or substantially the same as the reference density value.

The individual density variation trace or the adjusted individual density variation trace is then stored in a storage device at block 1212. For example, the individual density variation trace or the adjusted individual density variation trace can be stored in a look-up table in the storage device 712 in FIG. 7.

Next, as shown in block 1214, a determination is made as to whether or not another density variation trace for a printhead in the same linehead for the same known print density needs to be analyzed. If so, the method returns to block 1204 and repeats until all of the individual density variation traces for the linehead and same known print density have been analyzed.

When all of the individual density variation traces for the same linehead and same known print density have been analyzed, a determination is made at block 1216 as to whether or not the print density variation traces for another linehead that are associated with same known print density need to be analyzed. If so, the process returns to block 1204 and repeats until all of the individual density variation traces that associated with the same known print density from all of the lineheads have been analyzed.

When all of the individual density variation traces for the same known print density from all of the lineheads have been analyzed, a determination is made at block 1218 as to whether or not there are individual density variation traces that are associated with another known print density represented in the test block pattern that need to be analyzed. If so, the method returns to block 1204 and repeats until all of the density variation traces for all of the known print densities in the test block pattern from all of the lineheads have been analyzed.

Embodiments in accordance with the invention can perform the method shown in FIG. 12 one or more times. The method of FIG. 12 can be performed each day prior to beginning any print jobs to calibrate the printing system. And the method of FIG. 12 can be performed during a print job to monitor and correct for any density variations that develop during the print job.

Embodiments in accordance with the invention can perform the method shown in FIG. 12 differently or can include additional functions or processes. For example, blocks 1200 and 1202 can be omitted and the method of FIG. 10 performed using a test block pattern. An individual density variation trace for each test block in the test block patterns is determined at block 1002 or block 1010. Using the density variation trace determined at block 1002 or the subsequent density variation trace from block 1010, the method of FIG. 12 then begins at block 1204 where the individual density variation trace is compared to a respective reference density value. The blocks 1204-1216 are then performed as shown.

Figure 14:
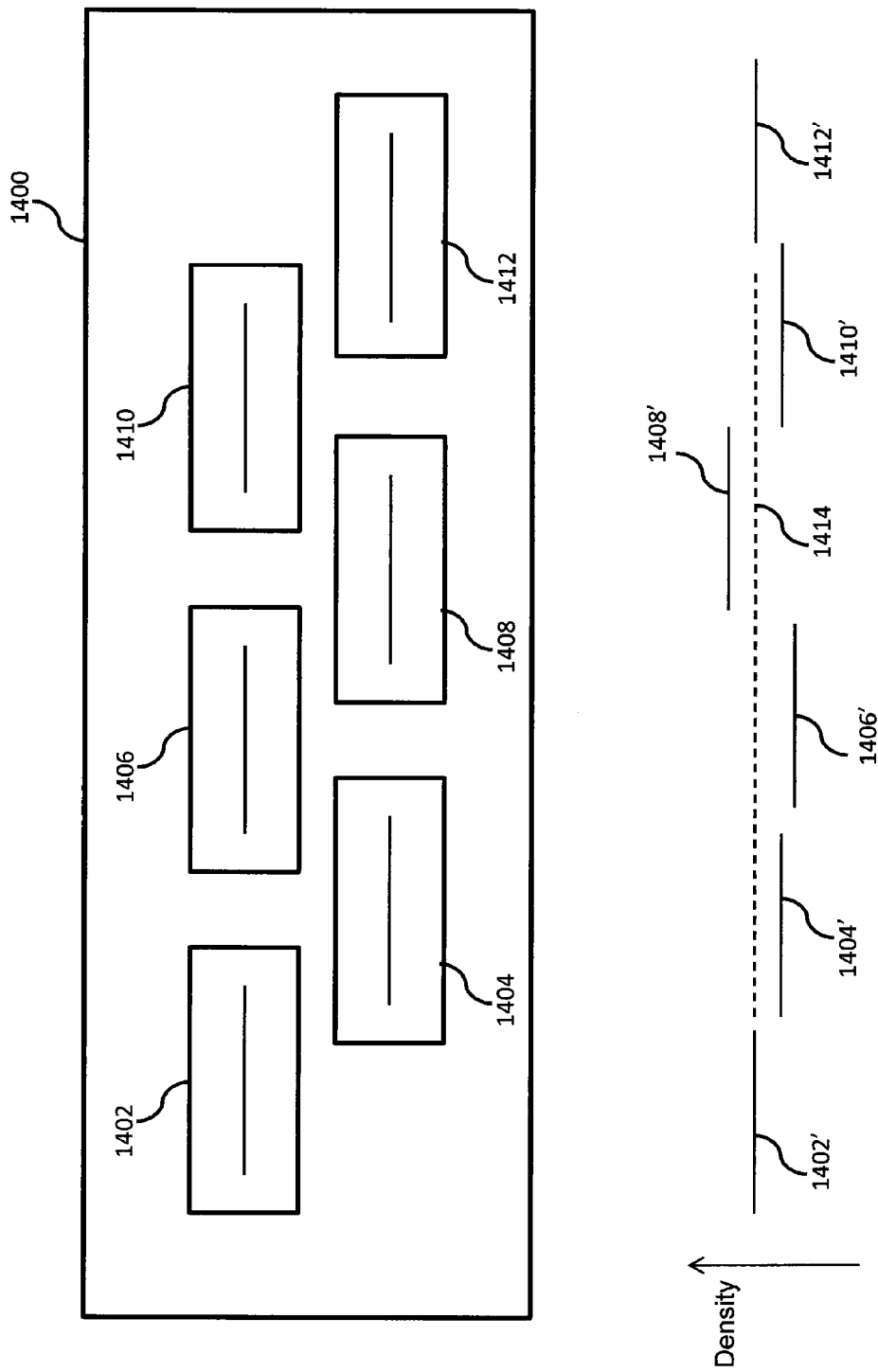
FIG. 14 illustrates one example of density variation traces for the printheads in a linehead after the method of FIG. 12 is performed in an embodiment in accordance with the invention.

Referring now to FIG. 14, there is shown one example of density variation traces for the printheads in a linehead after the method of FIG. 12 is performed in an embodiment in accordance with the invention. Linehead 1400 includes six printheads 1402, 1404, 1406, 1408, 1410, 1412. A density variation trace for each printhead is depicted as 1402', 1404', 1406', 1408', 1410', 1412'. Even after performing the method of FIG. 12, the density variation traces 1402', 1404', 1406', 1408', 1410', 1412' produced for content printed by the linehead for a known print density can differ slightly and be non-uniform across the linehead. In the illustrated embodiment, density variation trace 1408' has the highest density while density variation trace 1406' has the lowest density. The other four density variation traces 1402', 1404', 1410', and 1412' have densities that fall between the highest and lowest density variation traces 1408', 1406' respectively.

To correct for this non-uniformity between the printheads, an average density variation trace 1414 is determined and the individual density variation traces 1402', 1404', 1406', 1408', 1410', 1412' are adjusted to match the average density variation trace 1414. By proportionally changing the ink lay down quantity within each printhead to match the average density variation trace without changing the flat field uniformity, a resulting density variation between printheads can be minimized. A uniform or substantially uniform density variation trace can be produced across the width of the print media.

Figure 15:
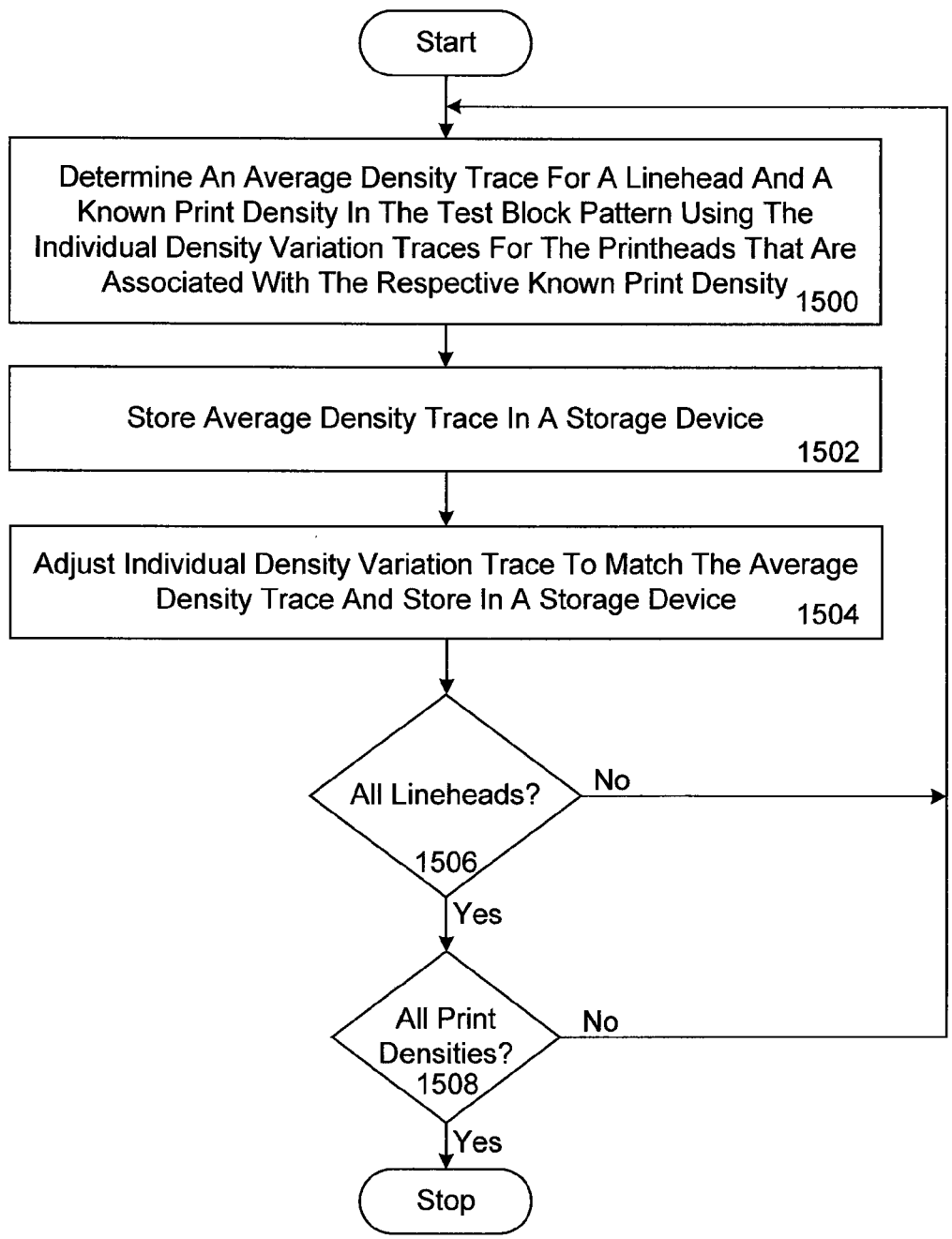
FIG. 15 is a flowchart of a second method for density variation correction in a printing system in an embodiment in accordance with the invention.

FIG. 15 is a second method for density variation correction in a printing system in an embodiment in accordance with the invention. The method of FIG. 15 is performed after the method of FIG. 12. The method of FIG. 15 corrects for density variations between printheads as depicted in FIG. 14.

Initially, an average density variation trace for a linehead and a known print density in the test block pattern is determined using the individual density variation traces that are associated with the respective known print density. For example, all of the density variation traces produced by the printheads in a linehead and associated with the print density of 0.2 are averaged together to produce an average density variation trace for the linehead and print density 0.2.

The average density variation trace is then stored in a storage device at block 1502. By way of example only, the average density variation trace can be stored in a look-up table in the storage device 712 of FIG. 7.

Next, as shown in block 1504, the individual density variation traces are adjusted to match the average density variation trace and the adjusted density variation traces are stored in a storage device. As discussed earlier, the ink lay down characteristics of each printhead in the linehead are adjusted proportionally across all of the nozzles in each printhead so that the overall printed density of the linehead is changed. The overall printed density of the linehead can increase or decrease without changing the flat field uniformity. The resulting change can be to have a printed density that is the same, or substantially the same as the average density variation trace.

A determination is then made at block 1506 as to whether or not all of the average density variation traces have been determined and analyzed for all of the lineheads and the same known print density. If not, the process returns to block 1500 and repeats until all of the average density variation traces have been determined and analyzed for all of the lineheads for the same known print density.

When the average density variation traces have been determined and analyzed for all of the lineheads and same known print density, the method continues at block 1508 where a determination is made as to whether or not an average density trace has been determined for all of the known print densities represented in the test block pattern. If not, the process returns to block 1500 and repeats until all of the individual density variation traces for all of the known print densities and for all of the lineheads have been adjusted.

Embodiments in accordance with the invention can perform the method shown in FIG. 15 one or more times. The method of FIG. 15 can be performed each day prior to beginning any print jobs to calibrate the printing system. And the method of FIG. 15 can be performed during a print job to monitor and correct for any density variations that develop during the print job.

Embodiments in accordance with the invention can perform the method shown in FIG. 15 differently or can include additional functions or processes. For example, blocks 1506 and 1508 can be omitted and blocks 1500-1504 performed for only select lineheads. By way of example only, a density variation in a linehead is corrected only when a difference between the individual density variation traces and the average density trace equals or exceeds a threshold.

As described herein, the method shown in FIG. 10 is performed first for flat field correction followed by the performance of the method shown in FIG. 12 for density variation correction. Other embodiments in accordance with the invention can reverse the performance of the flat field correction and density correction. The method shown in FIG. 12 can be performed first followed by the performance of the method of FIG. 10. The test block patterns printed in blocks 1200 are printed with original print data values and not with flat field corrected print data values. Additionally, in the embodiments that perform the method of FIG. 12 prior to performing the method of FIG. 10, block 1000 in FIG. 10 can be combined with block 1200 in FIG. 12 in that the test block printed in block 1000 can be one of the test blocks included in a test block pattern printed at block 1200. In these embodiments, block 1002 in FIG. 10 and block 1202 in FIG. 12 or FIG. 15 are also combined in that when the test blocks in the test block patterns are scanned in block 1202, the test block printed at block 1000 is also scanned. Thus, the printheads in the printing system print only a test block pattern and the scanned optically averaged pixel data is used for flat field correction and density variation correction.

Figure 16:
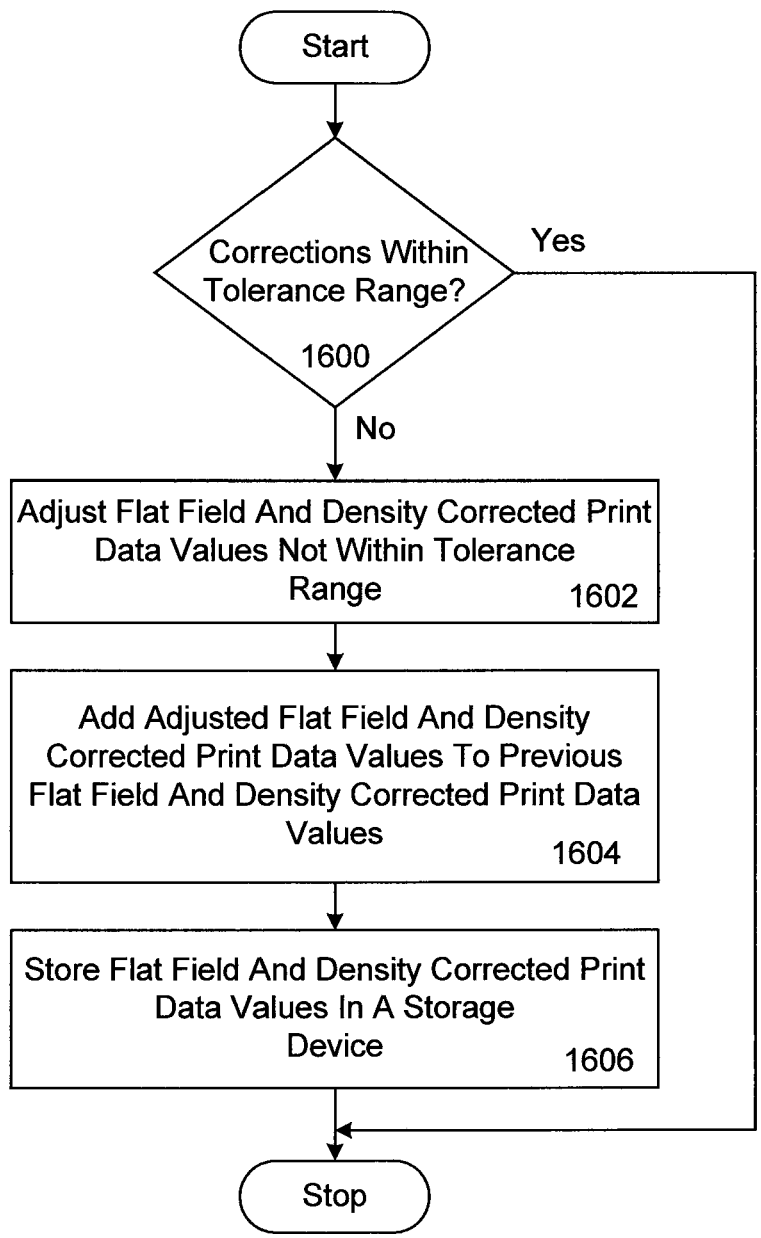
FIG. 16 is a flowchart of a method for adjusting flat field and density correction in an embodiment in accordance with the invention.

Referring now to FIG. 16, there is shown a method for adjusting flat field and density correction in an embodiment in accordance with the invention. The processes depicted in FIG. 16 can be performed after the method of FIG. 12 or FIG. 15. Using the flat field and corrected density values stored in one or more storage devices, a determination is made at block 1600 as to whether or not each flat field and corrected density values are within a tolerance range. If not, the flat field and corrected density values that are not within the tolerance ranges are adjusted to be within the tolerance range (block 1602). For example, each flat field and corrected density values outside the tolerance range can be adjusted to match a reference density value or an average density value.

Next, as shown in block 1604, the adjusted flat field and corrected density values are added to or summed with respective previous flat field and corrected density values. The summed flat field and corrected density values are then stored in a storage device (block 1606).

A print data value for each nozzle may be modified after performing flat field and density variation corrections. When content is to be printed, each print data value may be modified using respective values in the negative print mask (FIG. 10) and the individual density variation trace or the adjusted individual density variation trace. Thus, a look-up table that stores the flat field and density variation corrections can include multiple storage locations for each nozzle in the lineheads in the printing system.

The print data values to be printed by a linehead can represent a density value that is not represented in the flat field and corrected density values stored in the storage device. Interpolation can be used to determine the flat field and corrected density values for the print density value to be printed. For example, the flat field and corrected density values can be produced for density values of 0.2 and 0.4, but a print data value can have a density value of 0.36. The flat field and corrected density values for the density values of 0.2 and 0.4 can be interpolated to determine flat field and corrected density values for a density value of 0.36.

Those skilled in the art will recognize the integrated imaging system is calibrated for particular density values measurements using techniques that are known in the art. For example, the integrated imaging system can be calibrated by capturing images of a density chart of known target print density patches.

The invention has been described in detail with particular reference to certain preferred embodiments thereof, but it will be understood that variations and modifications can be effected within the spirit and scope of the invention. And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

1. A printing system can include one or more lineheads that jet ink onto a moving print media and an integrated imaging system that captures images of content printed on the moving print media. Each linehead can include one or more printheads. A method for flat field correction in the printing system can include:

(a) a printhead printing a test block on the print media, where the test block has a known print density; (b) producing a density variation trace for the printhead by capturing an image of the printed test block and averaging pixel data in a transport direction; and (c) producing a negative print mask for the printhead by inverting the density variation trace.

2. The method as in clause 1, where producing a density variation trace for the printhead by capturing an image of the printed test block and averaging pixel data in a transport direction includes producing a density variation trace for the printhead by capturing an image of the printed test block and optically averaging pixel data in a transport direction.

3. The method in clause 1 can include storing the negative print mask in a storage device.

4. The method in any one of clauses 1-3 can include (d) producing flat field corrected print data values by combining the negative print mask with print data values.

5. The method in any one of clauses 1-4 can include:

(e) the printhead printing another test block having the known density value using the flat field corrected print data values;

(f) producing another density variation trace for the printhead by capturing an image of the printed test block and averaging pixel data in a transport direction;

(g) determining whether the other density variation trace is within a tolerance range;

(h) if the other density variation trace is not within the tolerance range, producing another negative print mask for the printhead by inverting the other density variation trace;

(i) summing the other negative print mask with a previous print mask; and (j) producing flat field corrected print data values by combining the summed negative print mask with print data values.

6. The method as in clause 5, where producing another density variation trace for the printhead by capturing an image of the printed test block and averaging pixel data in a transport direction includes producing another density variation trace for the printhead by capturing an image of the printed test block and optically averaging pixel data in a transport direction.

7. The method in clause 5 can include repeating (d)-(j) until the density variation trace is within the tolerance range.

8. The method in clause 7 can include storing the summed negative print mask in a storage device.

9. A printing system that can include a linehead that jets ink onto a moving print media and an integrated imaging system that captures images of content printed on the moving print media. The linehead can include one or more printheads. A method for flat field correction in the printing system can include: (a) each printhead printing a test block on the print media, where the test block has a known print density; (b) producing a density variation trace for each printhead by capturing an image of each printed test block and averaging pixel data in a transport direction; and (c) producing a negative print mask for each printhead by inverting each density variation trace.

10. The method as in clause 9, where producing a density variation trace for each printhead by capturing an image of each printed test block and averaging pixel data in a transport direction includes producing a density variation trace for each printhead by capturing an image of each printed test block and optically averaging pixel data in a transport direction.

11. The method in clause 9 or clause 10 can include storing the negative print masks in a storage device.

12. The method in any one of clauses 9-11 can include (d) producing flat field corrected print data values by combining the negative print masks with respective print data values.

13. The method in clause 12 can include:

(e) each printhead printing another test block having the known density value using the flat field corrected print data values;

(f) producing another density variation trace for each printhead by capturing an image of each printed test block and averaging pixel data in a transport direction;

(g) determining whether the other density variation traces are within a tolerance range;

(h) if a density variation trace is not within the tolerance range, producing another negative print mask for a respective printhead by inverting the other density variation trace;

(i) summing the other negative print mask with a previous print mask; and (j) producing flat field corrected print data values for the respective printhead by combining the summed negative print mask with print data values.

14. The method as in clause 13, where producing another density variation trace for each printhead by capturing an image of each printed test block and averaging pixel data in a transport direction includes producing another density variation trace for each printhead by capturing an image of each printed test block and optically averaging pixel data in a transport direction.

15. The method in clause 13 or clause 14 can include repeating (d)-(j) until the density variation trace for the respective printhead is within the tolerance range.

16. The method as in any one of clauses 13-15 can include storing the summed negative print mask in a storage device.

17. The method in clause 15 can include:

(k) each printhead printing a test block pattern on the print media using flat field corrected print data values, where the test block pattern includes test blocks having different known print densities;

(l) producing a density variation trace for each printed test block in the test block patterns by capturing an image of each test block and averaging pixel data in a transport direction;

(m) comparing one density variation trace that is associated with one known print density represented in the test block pattern from one printhead with a reference density trace;

(n) determining whether there is a difference between the density variation trace and the reference density trace; and (o) if there is a difference, adjusting the density variation trace to match the reference density trace.

18. The method as in clause 17, where producing a density variation trace for each printed test block in the test block patterns by capturing an image of each test block and averaging pixel data in a transport direction includes producing a density variation trace for each printed test block in the test block patterns by capturing an image of each test block and optically averaging pixel data in a transport direction.

19. The method in clause 17 or clause 18 can include repeating (m)-(o) for each density variation trace that is associated with the one known print density represented in the test block pattern for each printhead.

20. The method as in clause 19 can include repeating (m)-(o) for each density variation trace that is associated with another known print density represented in the test block pattern for each printhead.

21. A printing system can include a linehead that jets ink onto a moving print media and an integrated imaging system that captures images of content printed on the moving print media. The linehead can include one or more printheads. A method for density variation correction in the printing system can include:

(a) each printhead printing a test block pattern on the print media, where the test block pattern includes test blocks having different known print densities;

(b) producing a density variation trace for each printed test block in the test block patterns by capturing an image of each test block and averaging pixel data in a transport direction;

(c) comparing the density variation traces with respective reference density values;

(d) determining whether there is a difference between each density variation trace and a respective reference density value; and (e) if there is a difference, adjusting the density variation trace to match the respective reference density value.

22. The method as in clause 21, where producing a density variation trace for each printed test block in the test block patterns by capturing an image of each test block and averaging pixel data in a transport direction includes producing a density variation trace for each printed test block in the test block patterns by capturing an image of each test block and optically averaging pixel data in a transport direction.

23. The method as in clause 21 or clause 22, where each printhead printing a test block pattern on the print media includes each printhead printing a test block pattern on the print media using flat field corrected print data values.

24. The method in any one of clauses 21-23 can include (f) storing the density variation trace or adjusted density variation trace in a storage device.

25. The method in any one of clauses 21-24 can include:
prior to performing (e), determining whether the difference equals or exceeds a threshold value; and if the difference equals or exceeds the threshold value, performing (e).

26. The method in any one of clauses 21-25 can include:
determining an average density variation trace for each known print density represented in the test block pattern using the density variation traces that are associated with each known print density in the test block pattern; and adjusting the density variation traces to match respective average density variation traces.

27. The method in clause 26 can include storing the adjusted density variation traces in a storage device.

28. The method in clause 26 or clause 27 can include storing the average density variation traces in a storage device.

PARTS LIST 100 printing system
102 printing module
104 printing module
106 linehead
108 dryer
110 quality control sensor
112 print media
114 transport direction
116 turnover module
200 printhead
202 nozzle array
204 support structure
206 heat
300 overlap region
400 printed content having uniform density
500 printed content having non-uniform density
502 region
504 region
506 region
500 region
600 printed content having non-uniform density
602 region
604 region
606 region
700 printing system
702 integrated imaging system
704 print media
706 roller
708 image processing device
710 motion encoder
712 storage device
800 light source
801 opening in housing
802 transparent cover
804 folded optical assembly
806 image sensor
810 housing
812 mirror
814 mirror
816 lens
818 vent
820 vent
1100 test block having known density
1102 density variation trace
1104 inverted density variation trace
1106 printed content having non-uniform density
1108 printed content having substantially uniform density
1110 density variation trace
1112 density variation trace
1300 test block pattern

| | PARTS LIST |
|---|---|
| 1302 | test block |
| 1304 | test block |
| 1306 | test block |
| 1308 | test block |
| 1310 | test block |
| 1312 | test block |
| 1400 | linehead |
| 1402 | printhead |
| 1402' | individual density variation trace |
| 1404 | printhead |
| 1404' | individual density variation trace |
| 1406 | printhead |
| 1406' | individual density variation trace |
| 1408 | printhead |
| 1408' | individual density variation trace |
| 1410 | printhead |
| 1410' | individual density variation trace |
| 1412 | printhead |
| 1412' | individual density variation trace |
| 1414 | average density variation trace |

| | PARTS LIST |
|---|---|
| 100 | printing system |
| 102 | printing module |
| 104 | printing module |
| 106 | linehead |
| 108 | dryer |
| 110 | quality control sensor |
| 112 | print media |
| 114 | transport direction |
| 116 | turnover module |
| 200 | printhead |
| 202 | nozzle array |
| 204 | support structure |
| 206 | heat |
| 300 | overlap region |
| 400 | printed content having uniform density |
| 500 | printed content having non-uniform density |
| 502 | region |
| 504 | region |
| 506 | region |
| 500 | region |
| 600 | printed content having non-uniform density |
| 602 | region |
| 604 | region |
| 606 | region |
| 700 | printing system |
| 702 | integrated imaging system |
| 704 | print media |
| 706 | roller |
| 708 | image processing device |
| 710 | motion encoder |
| 712 | storage device |
| 800 | light source |
| 801 | opening in housing |
| 802 | transparent cover |
| 804 | folded optical assembly |
| 806 | image sensor |
| 810 | housing |
| 812 | mirror |
| 814 | mirror |
| 816 | lens |
| 818 | vent |
| 820 | vent |
| 1100 | test block having known density |
| 1102 | density variation trace |
| 1104 | inverted density variation trace |
| 1106 | printed content having non-uniform density |
| 1108 | printed content having substantially uniform density |
| 1110 | density variation trace |
| 1112 | density variation trace |
| 1300 | test block pattern |
| 1302 | test block |
| 1304 | test block |
| 1306 | test block |
| 1308 | test block |
| 1310 | test block |
| 1312 | test block |
| 1400 | linehead |
| 1402 | printhead |
| 1402' | individual density variation trace |
| 1404 | printhead |
| 1404' | individual density variation trace |
| 1406 | printhead |
| 1406' | individual density variation trace |
| 1408 | printhead |
| 1408' | individual density variation trace |
| 1410 | printhead |
| 1410' | individual density variation trace |
| 1412 | printhead |
| 1412' | individual density variation trace |
| 1414 | average density variation trace |

The invention claimed is:

1. A method for density variation correction in a printing system that includes a linehead that jets ink onto a moving print media and an integrated imaging system that captures images of content printed on the moving print media, wherein the linehead includes a plurality of printheads, the method comprising:

(a) using each printhead to print a test block pattern on the print media, wherein the test block pattern includes test blocks having different known print densities, each test block having a respective reference density value;

(b) producing a first individual density variation trace for each printed test block in the test block patterns printed by each of the plurality of printheads by capturing an image of each test block and averaging pixel data in a transport direction;

(c) comparing the first individual density variation traces with the respective reference density values;

(d) determining whether there is a difference between each first individual density variation trace and the respective reference density value;

(e) adjusting the first individual density variation traces in accordance with the determined difference by changing the ink lay down quantity provided by each printhead to adjust print values corresponding to the test block pattern printed by the plurality of printheads to match the respective reference density value, thereby producing printed densities that are substantially the same as the reference density values;

(f) using each printhead in response to its adjusted individual density variation trace to print an adjusted test block pattern on the print media;

(g) producing a second individual density variation trace for each printed test block in the adjusted test block pattern printed by each of the plurality of printheads;

(h) determining an average density variation trace based upon the second individual density variation traces; and (i) adjusting the second individual density variation traces to match the average density variation trace by changing the ink lay down quantity provided by each printhead to thereby correct density variation.

2. The method as in claim 1, wherein producing a first individual density variation trace for each printed test block in the test block patterns by capturing an image of each test block and averaging pixel data in a transport direction comprises producing a first individual density variation trace for each printed test block in the test block patterns by capturing an image of each test block and optically averaging pixel data in a transport direction.

3. The method as in claim 1, wherein (a) using each printhead to print a test block pattern on the print media comprises using each printhead to print a test block pattern on the print media using flat field corrected print data values.

4. The method as in claim 1, further comprising (i) storing the first individual density variation trace or adjusted first individual density variation trace in a storage device.

5. The method as in claim 1, wherein (e) adjusting the first individual density variation traces in accordance with the determined difference further comprises:
   determining whether the difference equals or exceeds a threshold value; and
   adjusting the first individual density variation traces only if the difference equals or exceeds the threshold value.

6. The method as in claim 1, further comprising (i) storing the adjusted second individual density variation traces in a storage device.

7. The method as in claim 1, further comprising (i) storing the average density variation traces in a storage device.

\* \* \* \* \*